United States Patent
Okon et al.

(10) Patent No.: US 6,804,509 B1
(45) Date of Patent: Oct. 12, 2004

(54) METHOD AND SYSTEM FOR NOTIFYING A CALLER THAT A CELLULAR PHONE DESTINATION IS AVAILABLE

(76) Inventors: Shmuel Okon, 36 Hanadiv St., Herzeliya (IL), 46485; Reuven Tal, 111 Zahal St., Kiron (IL), 55451

( * ) Notice: Subject to any disclaimer, the term of this patent is extended or adjusted under 35 U.S.C. 154(b) by 292 days.

(21) Appl. No.: 09/595,274

(22) Filed: Jun. 15, 2000

Related U.S. Application Data (60) Provisional application No. 60/140,036, filed on Jun. 18, 1999.

(51) Int. Cl.[7] .............................................. H04M 11/00
(52) U.S. Cl. .................... 455/414.1; 455/416; 455/458; 455/567
(58) Field of Search .............................. 455/414.1, 528, 455/567, 510, 417, 560, 466, 462, 433, 445, 517, 458, 460; 379/209.01, 210.01

(56) References Cited

U.S. PATENT DOCUMENTS

| | | | |
|---|---|---|---|
| 3,906,166 A | 9/1975 | Cooper et al. | |
| 5,224,146 A | 6/1993 | Tanaka et al. | |
| 5,268,957 A | * 12/1993 | Albrecht | ................ 379/209.01 |
| 5,313,517 A | 5/1994 | Inaguma | |
| 5,406,616 A | 4/1995 | Bjorndahl | |
| 5,504,804 A | 4/1996 | Widmark et al. | ............. 379/63 |
| 5,610,972 A | 3/1997 | Emery et al. | .................. 379/58 |
| 5,794,143 A | 8/1998 | McCarthy et al. | |
| 5,943,397 A | 8/1999 | Gabin et al. | |
| 5,956,395 A | 9/1999 | Song | |
| 5,963,864 A | 10/1999 | O'Neil et al. | ................ 455/455 |
| 5,995,848 A | * 11/1999 | Nguyen | ........................ 455/528 |
| 6,032,040 A | * 2/2000 | Choy et al. | .................. 455/414 |
| 6,058,303 A | 5/2000 | Åström et al. | |
| 6,081,725 A | * 6/2000 | Ishida | .......................... 455/462 |
| 6,122,509 A | 9/2000 | Nguyen | ........................ 455/433 |
| 6,154,644 A | * 11/2000 | Murray | ..................... 455/414.1 |
| 6,185,433 B1 | * 2/2001 | Lele et al. | ................... 455/528 |
| 6,215,782 B1 | * 4/2001 | Buskens et al. | ............. 370/350 |
| 6,477,364 B1 | * 11/2002 | Otake | ....................... 455/414.1 |
| 6,553,221 B2 | * 4/2003 | Nakamura et al. | ........... 455/415 |

OTHER PUBLICATIONS

Repeat Dialing—wysiwyg://9/http://www.bellatlanti..home/NY/Products/RDX–01, 2 pages.
Repeat Dianiling—wysiwyg://9/http://www.bellatlanti-...home/NY/Products/RDX–01, 2 pages.

* cited by examiner

*Primary Examiner*—Charles Appiah
(74) *Attorney, Agent, or Firm*—Darby & Darby (57) ABSTRACT

A method for connecting a caller to a called destination when the destination is initially unreachable comprises the steps of receiving in a communication network a call origination from the caller to the unreachable destination, determining if the caller and destination are not busy and also are available to receive a call, and, when both are available and not busy, notifying the caller that the destination is available and subsequently making the connection. The system is particularly adapted for use with cellular networks wherein destination numbers are frequently unavailable because they are off, out of range, or due to insufficient network resources. The system does not rely upon cellular registration to determine if a destination is available but instead attempts to access the destination direction directly to ensure that the call can actually be completed before the caller is notified.

24 Claims, 5 Drawing Sheets

METHOD AND SYSTEM FOR NOTIFYING A CALLER THAT A CELLULAR PHONE DESTINATION IS AVAILABLE

STATEMENT OF RELATED APPLICATION

This application claims priority from U.S. Provisional Application No. 60/140,036 filed on Jun. 18, 1999 and entitled "Notification Service of Cellular Phone Destination Becoming Available", the entire contents of which are expressly incorporated herein.

FIELD OF THE INVENTION

This invention relates generally to communications systems and, more particularly, to a method and system for connecting a caller to a called destination when the destination is initially unreachable.

BACKGROUND OF THE INVENTION

It is a common occurrence for one individual to try and call another individual on the telephone but be unable to get through, i.e., progress to the point where the destination telephone is ringing. The most common situation is when the destination number is busy. For standard wired telephone numbers, this is generally the only reason why a call cannot be cellular telephones, however, the situation is more complex. In addition to simply being busy, a very significant percentage of cellular phones are normally unavailable.

A cellular telephone can be unavailable for many reasons including that the telephone is off, the battery is exhausted, or that the telephone is out of range or cannot receive a sufficiently strong signal. In addition, even when a cellular telephone is fully operational and receiving a strong signal, the telephone can still be unavailable due to a lack of available channels within the given cell.

Because of the inherent structure of cellular telephone systems, even if the central control system can determine if a cellular telephone is busy, it cannot easily distinguish between phones which are available or those which are not. Thus, when a call directed to a cellular telephone is initiated, the system might not know whether the call can be completed. Instead, it conducts a search for the destination cell by cell until it is found or the system gives up. If the destination is unavailable, a message to that effect is generally played for the calling party.

In response, the calling party might redial the number from time to time in hope that the receiving call party becomes available. This is a time-consuming process for the call initiator and also contributes a significant part to the load on the cellular system during the redials when the destination is unavailable due to all the futile redials, without any revenue to the cellular service provider. In many cases the party initiating the call will give up and abort after one ore more redials, depending on his desires and circumstances, and this will generally cause loss of revenue to the service provider.

Various systems have been implemented to address the situation when a calling party cannot immediately reach the destination number. For example, some telephone service providers offer services such as "Repeat Dialing" wherein when a busy signal is reached, the caller can request that the telephone system monitor the busy status of the destination and then inform the caller when the line is free. While suitable for wired telephone systems, conventional repeat dialing applications do not address the problems of unavailability when the destination is a cellular telephone. Thus, even if the system determines that a destination number is no longer busy, the system does not know why. As a result, the caller can be informed that the destination is free, only to find that even though the destination is no longer busy, the destination is not available because, for example, the destination is out of range, the telephone has been turned off, or there is insufficient capacity in the cell to establish the connection.

Some attempts have been made to address the problem of making connections to unavailable wireless telephones. For example, U.S. Pat. No. 5,794,143 to McCarthy et al. discloses a method and apparatus for ultimately completing telephone calls to unavailable wireless telephones. As described in the '143 patent, when a call to a wireless telephone cannot be completed, the system marks the destination number as being unavailable. The system then waits for the destination telephone to register itself within the network. After a registration is detected, the system notifies the caller that the destination telephone is available to receive calls. While the system and method of the '143 patent does serve to reduce number of times the caller must redial an initially unavailable destination, the system does not guarantee that a call to the destination will, in fact, go through after the caller is notified of the availability. This is because the system relies only on the registration of a telephone in a wireless network as a signal to retry the call.

Registration tells a wireless network when a telephone first enters the network. However, it conveys no information about whether the telephone remains in the network after registration. Thus, if a telephone is unavailable for one of the reasons previously mentioned, the controller in the '143 patent will still view the status of the telephone as "registered" and therefore believe that the phone can be reached and inform the caller accordingly. In reality, the actual status of a registered cellular telephone is undetermined because conditions can change after registration occurs which would prevent a call from being completed, such as the telephone losing signal or the battery running out. In addition, there are circumstances where a validly registered and active telephone can still be unavailable due to, e.g., insufficient resources. If an unreachable telephone is marked by the system as unavailable, the system will not return the telephone to the available condition until it receives a new registration. However, because this unreachable telephone is still registered, there is no need to re-register with the network and thus the '143 system could theoretically wait forever to receive a registration signal. In addition, the '143 system assumes that the caller is always reachable and makes no provision for situations where the caller's telephone is busy or otherwise unreachable.

More modern cellular telephone networks implement various "Intelligent Network" functionality which is designed to monitor the status of cellular devices. Intelligent networking has been implemented largely in conjunction with wireless messaging services to enable the system to monitor the activity of a cellular handset. Such a system is described in U.S. Pat. No. 6,058,303 to Åström et al. entitled "System and Method for Subscriber Activity Supervision." However, as in the '143 system, the '303 system also relies on the registration condition of the cellular device to determine if it is reachable and thus suffers from the same problems as the '143 system discussed above regarding the instantaneous availability of the device within the network.

Accordingly, it is an object of the present invention to provide a method and system for notifying a caller that a previously unavailable cellular phone destination is available which avoids the false negatives and positives associated with a registration-based system.

It is a further object of the present invention to provide a method and system which notifies a caller that a previously unavailable cellular phone destination is available only when there are sufficient system resources to complete a call to the destination.

SUMMARY OF THE INVENTION

These and other objects are achieved by a method and system according to the invention in which the system connects a caller to a called destination when the destination is initially unreachable comprising only after determining both that the destination is not busy and that the destination is available. The system can also monitor the availability of the caller and establish the connection only when both parties are not busy and available. In one implementation, a determination that a specific (cellular) destination is available is made by initiating a call handshake process between a network controller in the communication network to establish contact with the destination and then pausing the handshake process before a ring signal is sent to the destination which would indicate an incoming call. The handshaking can be allowed to proceed to the point that a voice channel is assigned to for the call. That channel can be held in reserve to ensure that when the actual attempt to reconnect to the destination is made, there will be sufficient network resources to place the call. In a preferred embodiment, the invention is implemented within a control system used to manage the operation of a cellular network. The system is configured to spawn a program task for each caller/unreachable-destination pair to be retried.

In addition to addressing an initially unreachable destination, the present invention can also be used to reconnect callers when a call is abnormally terminated, such as when a cellular telephone moves out of signal range or exhausts its battery. Upon detecting an abnormal call termination, the system, possibly at the direction of the party still connected to the network, can initiate a process similar to that used to connect an initially unreachable destination which will reconnect the parties when both are not busy and available.

BRIEF DESCRIPTION OF THE DRAWINGS

The foregoing and other features of the present invention will be more readily apparent from the following detailed description and drawings of illustrative embodiments of the invention in which.

DETAILED DESCRIPTION OF THE PREFERRED EMBODIMENTS

Figure 1:
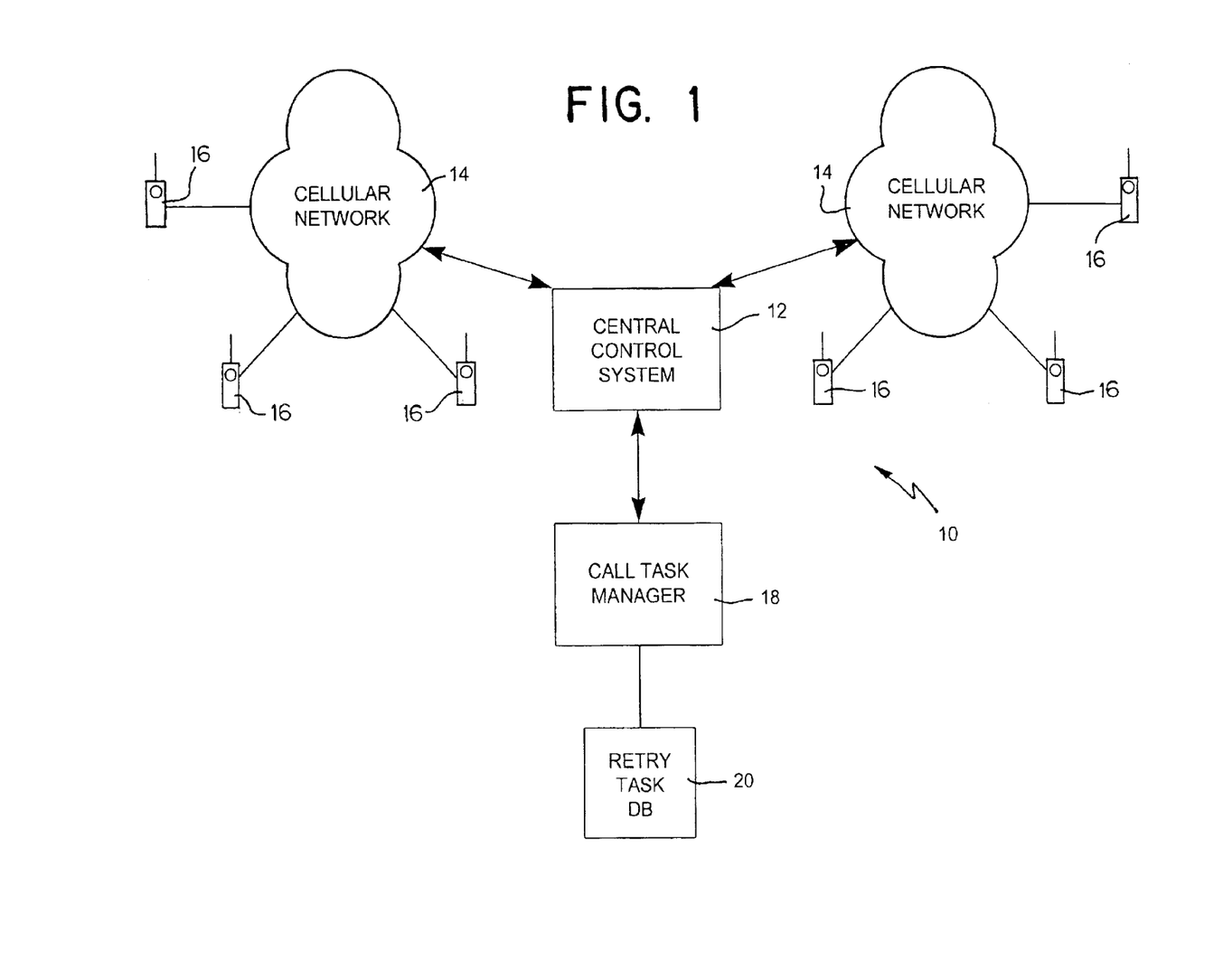
FIG. 1 is shown a high-level diagram of a cellular communication system 10 for implementing the present invention.

Turning to FIG. 1, there is shown a high-level diagram of a cellular communication system 10. The system 10 is managed by a central control system which is connected to one or more cellular networks 14 and therethrough to a plurality of cellular telephones 16. The central control system 12 comprises generally a programmed computer system which is responsible for managing the operation of the cellular network. Although a centralized system is illustrated, network management features can also be implemented in a distributed fashion.

Various types of derivative or add-on functionality can be added to the control system, such as voice mail and messaging services. Using similar techniques known to those of skill in the art, a call task manager 18 and an associated retry task database 20 can be implemented within or added to the functional of the central control system 12. The call task manager 18 addresses situations where a call is placed to a cellular telephone caller that is unavailable. As discussed in more detail below, the call task manager 18 acts as an intelligent agent for the calling party and informs the calling party when the previously unavailable destination is available to receive a telephone call, preferably only when there are sufficient system resources to complete a call to the destination. If the present system is implemented in conjunction with a voice mail system, preferably the caller is asked by the system if they would like to be notified when the destination becomes available prior and then prompted to leave a message if desired.

In general, when a caller tries to reach a destination and the destination is unreachable, either because it is busy or because it is unavailable, the call task manager 18 initiates a process, upon the direction of the caller, which monitors the status of the destination and possibly the caller as well, particularly if the call was placed from a cellular telephone, and informs the caller when the destination is available to receive a call. According to the invention, monitoring of a party, such as the destination, includes both determining if the party is busy and determining if the party is available to receive calls within the network. Only when both the caller and the destination parties are each not busy and available is an attempt made to establish the connection. (As used herein, the term "connecting" two parties with each other means establishing a connection through the communication network to the point that the destination number is ringing. It does not require the called party actually answer the telephone.)

Determining if either the destination or the caller is busy is a fairly straightforward procedure. The call task manager 18 has access to the resources of the central control system 12 through which the call is placed and normal network operating procedures automatically check to see if a telephone is busy when call to the number is initiated.

When determining if the destination or caller is available to receive calls within the network, the call task manager 18 does not rely upon a possibly out of date registration status. Instead, the call task manager 18 initiates a process to establish contact with the party and thereby determine both that the party's cellular device itself is activated and in range and that the particular active cell for the party has sufficient capacity to assign a communications channel to the destination. The particular communication handshaking procedure used to make this determination depends upon the specific technology used to implement the cellular network.

In a conventional cellular network, the normal call initiation procedure can be used. In this process, one or more base stations are directed to transmit the address of the destination handset. If available, the handset responds with a ready status signal after which a voice channel is assigned for the conversation. During a standard call, a ring signal is then sent to the handset. More details regarding this conventional handshaking procedure are provided in U.S. Pat. No. 3,906,166 to Cooper et al. for a "Radio Telephone System", the entire contents of which are hereby expressly incorporated by reference.

According to one aspect of the invention, the handshaking procedure is terminated or suspended after contact is established with the handset but prior to sending a ring signal which would result in a notification (auditory or otherwise) to the called party that a call is incoming. In one embodiment, the procedure can be terminated after the handset responds to the initial query. This provides high assurance that the destination will be reachable when the caller's call is retried. In an alternative embodiment, the procedure is ended after a voice channel is assigned the call. By holding this assigned channel in reserve, the system can guarantee that when the caller's call is retried, there will be a channel available within the cell on which the destination can be reached.

Figure 2:
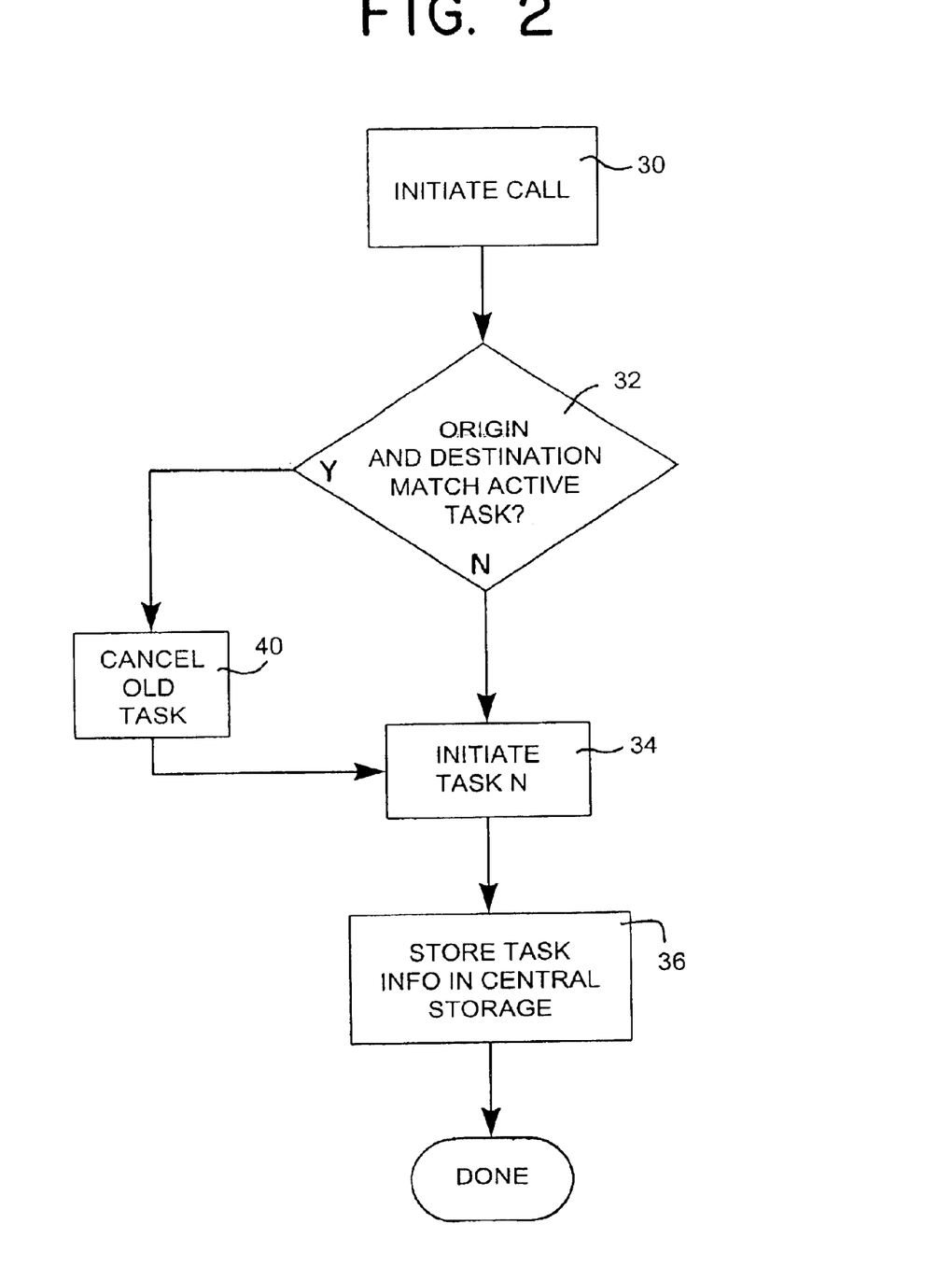
FIG. 2 is a flowchart of a main call initiation loop.
Figure 3:
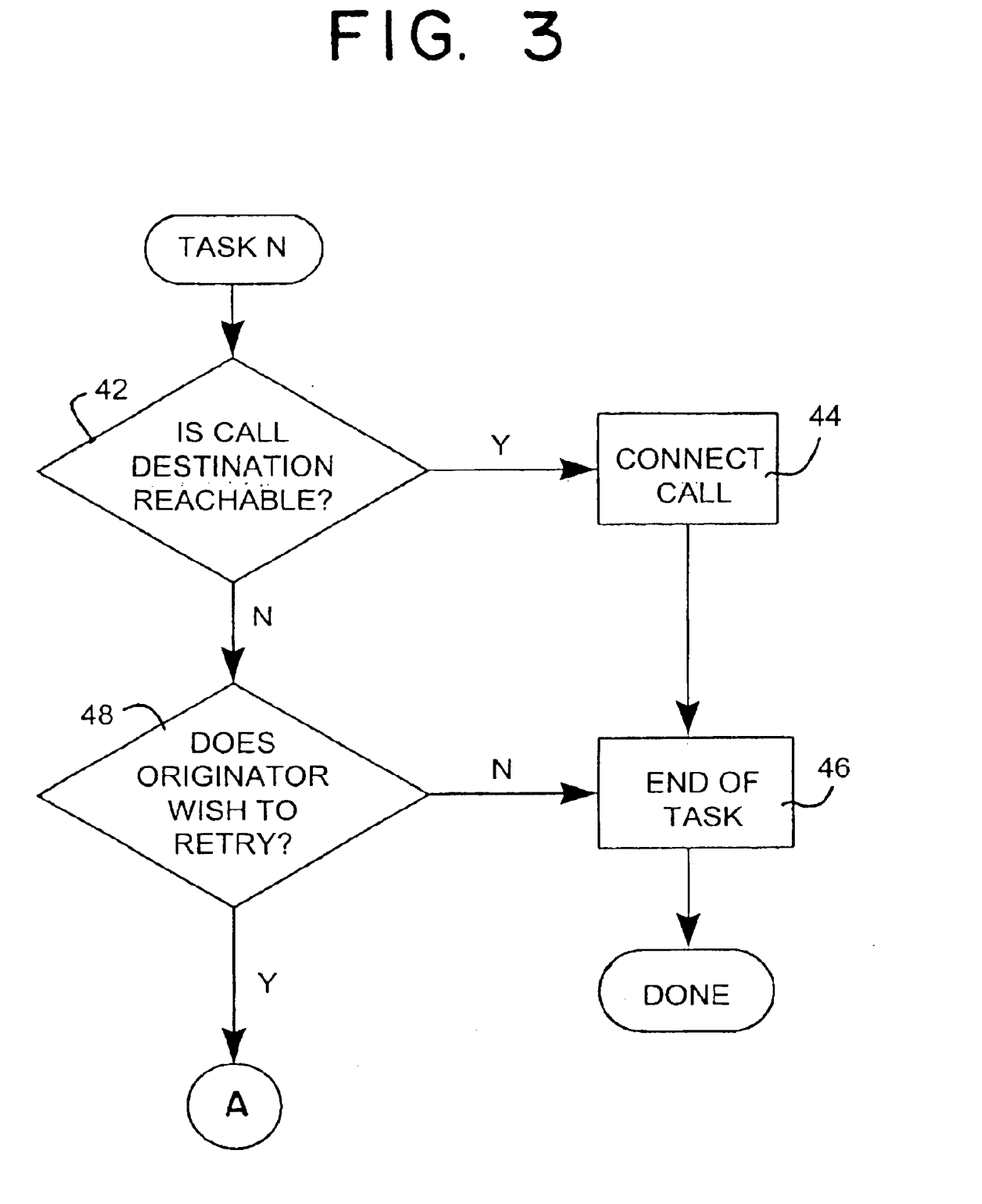
FIGS. 3, 4A and 4B are flowcharts of one method of implementing a task to connect the caller with the destination, wherein FIGS. 4A and 4B comprise a single flowchart connected along match line A–A (hereinafter, more generally referred to as FIG. 4).
Figure 4A:
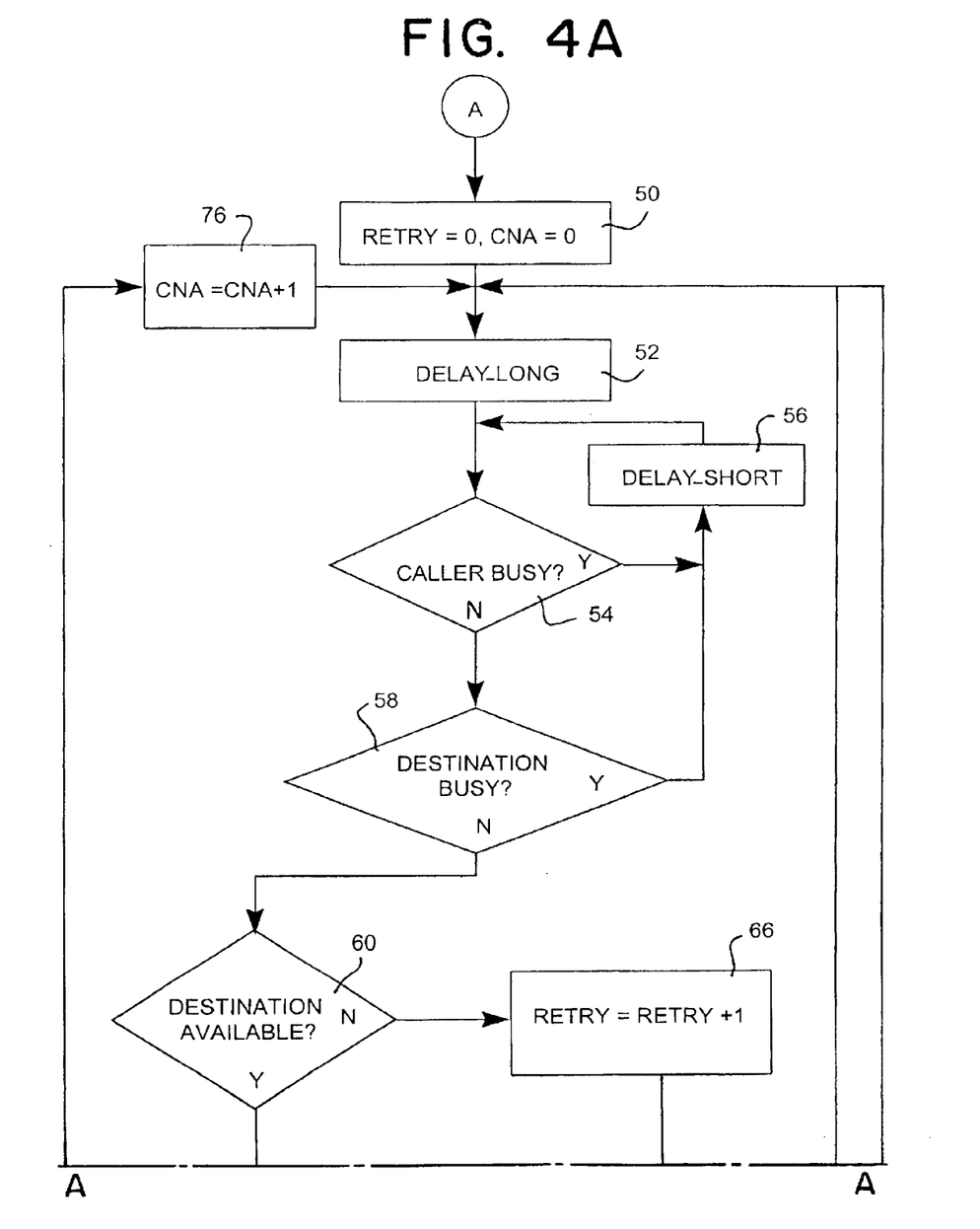
Figure 4B:
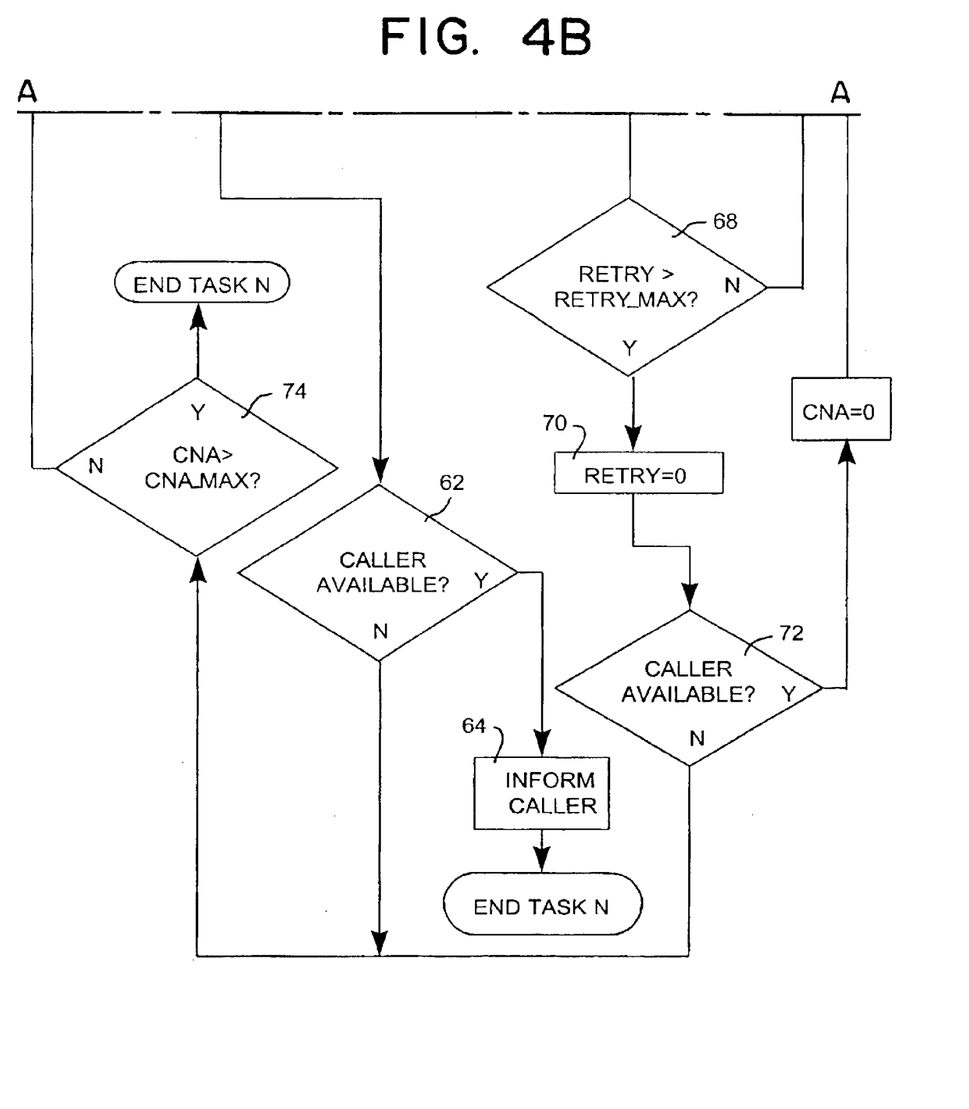

One specific method for implementing the present invention is disclosed in the flowcharts of FIGS. 2–4. Turning to FIG. 2, there is shown a main call initiation loop which executes with the central control system and/or the call task manager. In brief, when a new call is received by the system (step 30), a call task is spawned, which task takes the necessary steps to connect the caller to the destination (step 34). Information need to identify the task, such as the calling number, the destination number, a task ID, are stored in a central storage or task database (step 36).

Many such tasks are typically operating at the same time. As discussed more fully below, if the initial destination is not reachable, the assigned task remains active until the call is completed, or the task is aborted by the initial caller, or a maximum lifetime is reached. In a preferred implementation, when a call is received from a caller to a destination, the system determines whether the caller and destination match a currently pending task. (Step 32) In other words, is the system already trying to connect that caller with the specified destination. If so, the retry can be used as a signal to the system to cancel the specific prior task (step 40) and possibly initiate a new task. In this manner, a caller who has attempted to reach a specific unavailable destination and subsequently requested the system to inform them when the destination is available can later cancel the request by redialing the number or modify the request to, e.g., specify a different maximum lifetime before the task expires. More generally, when the caller subsequently tries to dial a destination for which there is already an assigned task, the system can detect this condition and provide the caller with a selection of options relative to the ongoing task.

FIGS. 3 and 4 are flowcharts of one method of implementing a task to connect the caller with the destination. Initially, a determination is made whether the destination is reachable. (Step 42). In other words, the task tries to connect the call as per normal operating procedures for the network. If the destination is available and not busy, the caller is connected with the destination (step 44) and the task can be terminated (step 46).

If the call cannot be connected, the caller is preferably given the option to request that the task monitor the destination and inform the caller when the destination is reachable. (Step 48). If the caller does not want the system to provide such a notification, the task can be terminated. Otherwise, the task enters the main loop illustrated in FIG. 4. It will be appreciated that the task can be assigned a default lifetime after which it will automatically terminate. In addition various user specified parameters can be received, such as a priority relative to other tasks assigned to the same caller and a specified task lifetime. If tasks from multiple callers are attempting to reach the same destination, the system can assign a relative priority between those tasks. The caller can also be informed of this condition and possibly, perhaps for an added fee, given priority status relative to tasks from other callers.

Turning to FIG. 4, when the main retry loop is started various counters are initialized. (Step 50). In this embodiment, two counters are used. A retry counter which keeps track of the number of times the destination has not been available and a CNA counter which keeps track of the number of times the caller is not available. To avoid immediately retrying access to the destination number just found to be unreachable, a first delay (designated as delay_long) is preferably initiated. (Step 52). Although not required, after the first delay the task preferably determines if the caller's number is busy. (Step 54). If the caller is busy, the task repeats the caller-busy check (step 54) until the caller is available, perhaps with a second delay (designated as delay_short) (step 56) between busy checks. As discussed above, determining whether a number is busy is a relatively simple procedure and does not utilize significant system resources. By ensuring that the caller's telephone is not busy, the system does not expend resources to investigate the status of the destination when, even if the destination is reachable, the caller is not free to accept the retried call. If the caller is not busy, the task determines if the destination is busy. (Step 58). If the destination is busy, the caller-busy and destination-busy checks are repeated (steps 54–58) until both caller and destination are not busy. Preferably, the second delay (between busy checks) is much shorter than the first delay (between available checks) because, on average, a busy phone will cease to be busy much more quickly than an unavailable phone becomes available.

Once the destination is not busy, the system determines if the destination is available. (Step 60). If so, a further check can be made to determine if the caller is available. (Step 62). This additional step addresses situations when the call was initiated from a cellular device which might not always be available. (If either the caller or destination devices are wired telephones, the check for availability of the respective device will, in general, always be true.) Provided that the destination and caller are both available and not busy, the system informs the caller that the call to the destination can be put through (step 64) and, upon the caller's approval, a connection is established between the caller and the destination.

If the destination is not available, the retry counter is incremented and the busy/destination available checks are repeated if the retry counter does not exceed a maximum predefined value RETRY_MAX. (Step 68). If the retry counter exceeds the maximum value, the RETRY parameter can be reset to zero (step 70) and, preferably, a check to determine if the caller is available performed. (Step 72).

In the preferred embodiment, after each of step 62 and step 72, if the caller is not available, a determination is made as to whether the caller has been unavailable for more than a predetermined period of time or number of checks. If the caller has been unavailable for more than a maximum predefined limit (CNA_MAX) (step 74), the task can be terminated. Otherwise, the CNA counter is incremented (step 76) and the process repeated starting from step 52. If, following step 72, the caller is available, the CNA counter can be reset to zero (step 78) and the process repeated from step 52.

While the main task loop of FIG. 4 has been discussed with regards to discrete counters, the system can be implemented to include termination codes for specific tasks or all tasks and to assign each task a specific lifetime. In such as case, a task monitoring routine could monitor the remaining lifetimes for each task and, upon the expiration of a lifetime, issue a notice to terminate the task (unless, of course, it is in the process of actually establishing the communication link). In addition, while a Retry and CNA counter is used to restrict the lifetime of the task based on actual conditions, the counters can be replaced or supplemented with various timers instead which can, e.g., set a maximum amount of time for the destination or caller to be busy or unavailable before giving up. In addition, the various parameters which control the operation of each task can be set dynamically according to overall system considerations according to various predefined criteria.

As will be appreciated, a single caller may have many callback tasks running at the same time. In one implementation, a system access number or other mechanism is provided wherein a caller can access the system and review any pending tasks. The caller can be given the option to reorder and prioritize tasks, cancel selected tasks, reset various time limits, etc.

In addition to the problem of cellular telephones being unavailable when a call is initially placed, another problem with cellular telephones is the tendency for calls to be unexpectedly terminated when a participating cellular user's signal is cut off. This can occur from many factors, including a failure during the hand-off process between cells, leaving the coverage area, moving behind something which obstructs the signal, battery exhaustion, etc.

According to a further aspect of the invention, the method of connecting a caller to an unavailable destination disclosed above is not limited only for use during situations when the destination is initially unavailable. Instead, the method can also be used to reconnect a call between one or more cellular telephones, which call is disconnected when one of the cellular telephones leaves the coverage area, exhausts its battery, etc. In such instances, a suitable task would be initiated upon the detection by the cellular system that a call was abnormally terminated. The task could be assigned the role of establishing a connection between the two prior callers. In one implementation, the caller remaining on the line could be given the option of having the system automatically attempt to reestablish contact when the lost party reenters the system. If the caller agrees, the task would proceed in a manner similar to if that caller had tried to call the lost party but could not get through.

While the invention has been particularly shown and described with reference to preferred embodiments thereof, it will be understood by those skilled in the art that various changes in form and details may be made therein without departing from the spirit and scope of the invention.

We claim:

1. A method for connecting a caller to a called destination when the destination is initially unreachable comprising the steps of:

receiving in a communication network a call origination from the caller to the unreachable destination;

(a) determining if the destination is busy;

(b) determining if call completion with the destination is available;

(c) repeating steps (a) and (b) until call completion with the destination is available and the destination not busy;

(d) notifying the caller that the call completion with destination is available;

(e) determining if the caller is busy;

(f) determining if the caller is available; and repeating steps (e) and (f) until the caller is available and not busy prior to step (d).

2. The method of claim 1, wherein the step (b) determining if the destination is available comprises initiating a call handshake process between a network controller in the communication network to establish contact with the destination, the call handshake process pausing before a ring signal is sent to the destination.

3. The method of claim 2, wherein the step of initiating a call handshake process further comprises assigning a voice channel between the destination and a base station.

4. The method of claim 1, wherein step (d) further comprises establishing a connection between the caller to the destination upon the approval of the caller.

5. The method of claim 1, wherein the repeating step (c) is performed at most for a maximum time period.

6. The method of claim 5, wherein the maximum time period is specified by the caller.

7. The method of claim 1, wherein step (b) is performed only if the destination is not busy.

8. The method of claim 1, further comprising the steps of:

after receiving the call origination from the caller to the unreachable destination, initiating a specific task to connect the caller to the called destination, the task implementing steps (a) through (d).

9. The method of claim 8, further comprising the step of, upon the detection of a subsequent call from the caller to the prior destination terminating the specific task if the specific task is still active.

10. A method for connecting a caller to a called destination when the destination is initially unreachable comprising the steps of:

(a) determining if the caller is busy;

(b) determining if the destination is busy;

(c) repeating steps (a) and (b) until the destination is not busy and the caller is not busy;

(d) determining if call completion with the destination is available; and (e) notifying the caller when call completion with the destination is available.

11. The method of claim 10, further comprising the step (f) if the destination is not available, repeating steps (a) through (e).

12. The method of claim 11, wherein the step (f) is performed until a maximum destination retry condition is reached.

13. The method of claim 10, further comprising, prior to step (e), the step of (g) determining if the caller is available;

wherein the caller is notified that the destination is available only if the destination is available and the caller is available.

14. The method of claim 13, further comprising the step of (h) if the caller is not available, repeating steps (a) through (e) and (g).

15. The method of claim 14, wherein the step (h) is performed until a maximum caller retry condition is met.

16. The method of claim 10, further comprising the step of delaying a first period of time prior to executing step (a).

17. A system for connecting a caller to a called destination when the destination is initially unreachable comprising:

a control system for managing the operation of a cellular network;

the control system including a programmed computer configured to, upon receiving in the network a call origination from the caller to the unreachable destination;

(a) determine if the destination is busy;

(b) determine if call completion with the destination is available;

(c) repeat steps (a) and (b) until call completion with the destination is available and the destination is not busy;

(d) notify the caller that call completion with the destination is available.

(e) determining if the caller is busy;

(f) determining if the caller is available; and repeating steps (e) and (f) until the caller is available and not busy prior to step (d).

18. The system of claim 17, wherein the control system is configured to determine if the destination is available by initiating a call handshake process between a network controller in the communication network to establish contact with the destination and pausing the call handshake process before a ring signal is send to the destination.

19. The system of claim 18, wherein the control system is configured to pause the call handshake process after a voice channel is assigned to the destination.

20. The system of claim 17, wherein the control system is further configured to establish a connection between the caller to the destination upon the approval of the caller.

21. The system of claim 17, wherein the control system is configured to determine if the destination is available only if the destination is not busy.

22. A method for connecting a caller to a called destination when the destination is initially unreachable comprising the steps of:

receiving in a communication network a call origination from the caller to the unreachable destination;

(a) determining if the destination is busy;

(b) determining if the destination is available;

(c) repeating steps (a) and (b) until the destination is available and not busy;

(d) notifying the caller that the destination is available;

(e) determining if the caller is busy;

(f) determining if the caller is available; and repeating steps (e) and (f) until the caller is available and not busy prior to step (d).

23. A method for connecting a caller to a called destination when the destination is initially unreachable comprising the steps of:

(a) determining if the caller is busy;

(b) determining if the destination is busy;

(c) repeating steps (a) and (b) until the destination is not busy and the caller is not busy;

(d) determining if the destination is available;

(e) notifying the caller when the destination is available;

(d) prior to step (e), the step of (g) determining if the caller is available; and wherein the caller is notified that the destination is available only if the destination is available and the caller is available.

24. A system for connecting a caller to a called destination when the destination is initially unreachable comprising:

a control system for managing the operation of a cellular network;

the control system including a programmed computer configured to, upon receiving in the network a call origination from the caller to the unreachable destination;

(a) determine if the destination is busy;

(b) determine if the destination is available;

(c) repeat steps (a) and (b) until the destination is available and not busy;

(d) notify the caller that the destination is available;

(e) determine if the caller is busy;

(f) determine if the caller is available; and repeat steps (e) and (f) until the caller is available and not busy prior to step (d).

* * * * *